United States Patent
Pakusch et al.

(10) Patent No.: US 6,291,573 B1
(45) Date of Patent: *Sep. 18, 2001

(54) PREPARATION OF POLYMER POWDERS

(75) Inventors: Joachim Pakusch, Speyer; Bernd Reck, Grünstadt; Peter Claassen, Ludwigshafen; Hans-Jürgen Denu, Friedelsheim; Eckehardt Wistuba, Bad Dürkheim; Claudia Heibel, Weinheim, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/210,765

(22) Filed: Dec. 14, 1998

(30) Foreign Application Priority Data

Dec. 22, 1997 (DE) .............................................. 197 57 298

(51) Int. Cl.$^7$ ...................................................... C08L 29/04
(52) U.S. Cl. .............................. 524/503; 525/57; 526/202
(58) Field of Search .............................. 524/503; 525/57; 526/202

(56) References Cited

U.S. PATENT DOCUMENTS

| | | |
|---|---|---|
| 3,883,489 | 5/1975 | Matschke et al. . |
| 4,046,839 * | 9/1977 | Papetti ................. 260/880 |
| 4,250,228 * | 2/1981 | Fujioka ................. 428/539 |
| 4,288,335 | 9/1981 | Rivier . |
| 4,481,328 | 11/1984 | Harrêus et al. . |
| 4,590,227 * | 5/1986 | Nakamura ............. 523/130 |
| 4,743,507 * | 5/1988 | Franses ................. 428/402 |
| 5,034,295 * | 7/1991 | Allen ..................... 430/58 |
| 5,225,478 | 7/1993 | Beckerle et al. . |
| 5,274,057 * | 12/1993 | Georges ................. 526/202 |
| 5,462,978 | 10/1995 | Penzel et al. . |
| 5,527,544 * | 6/1996 | Nguyen ................. 424/489 |
| 5,744,520 * | 4/1998 | Lawrynowicz ........ 523/334 |
| 5,756,574 | 5/1998 | Baumstark et al. . |
| 5,959,017 * | 9/1999 | Eck ........................ 524/425 |

FOREIGN PATENT DOCUMENTS

| | | |
|---|---|---|
| 2181381 | 12/1994 | (CA) . |
| 2214410 | 10/1973 | (DE) . |
| 2445813 | 4/1976 | (DE) . |
| 2614261 | 10/1977 | (DE) . |
| 4 419 818 | 10/1994 | (DE) . |
| 4 435 423 | 10/1994 | (DE) . |
| 4 435 422 | 4/1996 | (DE) . |
| 3 143 070 | 5/1998 | (DE) . |
| 197 07 746 | 8/1998 | (DE) . |
| 0 040 419 | 11/1981 | (EP) . |
| 0 056 622 | 7/1982 | (EP) . |
| 0 062 106 | 10/1982 | (EP) . |
| 0 078 449 | 5/1983 | (EP) . |
| 0 407 889 | 1/1991 | (EP) . |
| 0 467 103 | 1/1992 | (EP) . |
| 0 576 844 | 1/1994 | (EP) . |
| 0 601 518 | 6/1994 | (EP) . |
| 0 629 650 | 12/1994 | (EP) . |
| 0 680 993 | 11/1995 | (EP) . |
| 0 754 657 | 1/1997 | (EP) . |
| 861 867 | 9/1998 | (EP) . |
| 1569637 | 6/1980 | (GB) . |
| 59 162 161 | 9/1984 | (JP) . |
| WO 95/33775 | 12/1995 | (WO) . |

OTHER PUBLICATIONS

Barbara Elvers, et al., Ullmann's Encyclopedia of Industrial Chemistry, vol. 21, pp. 743–747, "Polyvinyl Compounds, Others", 1992.
C. A. Finch, Wiley Interscience Publication, (table of contents), "Polyvinyl Alcohol", 1973.
Von W. Scholtan, et al., Kolloid–Z.u.Z Polymete, No. 250, pp. 782–796, "Bestimmung der Teilchengröbenverteilung von Latices mit der Ultrazentriguge", 1972.
Encyclopedia of Science and Technology, vol. 5, pp. 847–848, "Emulsion Polymerization", 1966.

* cited by examiner

Primary Examiner—Paul R. Michl
(74) Attorney, Agent, or Firm—Oblon, Spivak, McClelland, Maier & Neustadt, P.C.

(57) ABSTRACT

The present invention relates to a process for preparing polymer powders from aqueous polymer dispersions in which the dispersed polymer P comprises in copolymerized form:

i) at least one vinylaromatic monomer (a), ii) 1,3-butadiene as monomer (b), and iii) one or more monomers (c) different than the monomers (a) and (b), which comprises drying the aqueous polymer dispersion in the presence of polyvinyl alcohol as drying agent. The present invention also relates to the polymer powders obtainable by this process and to the use of these polymer powders as binders in paints, varnishes and coating compositions generally, in adhesives, and for modifying mineral construction materials. The present invention also relates to mineral construction materials in the form of dry formulations comprising the polymer powders of the invention.

9 Claims, No Drawings

PREPARATION OF POLYMER POWDERS

The present invention relates to a process for preparing polymer powders from aqueous polymer dispersions in which the dispersed polymer P comprises in copolymerized form i) at least one vinylaromatic monomer (a),
ii) 1,3-butadiene as monomer (b) and
iii) one or more monomers (c) different than the monomers (a) and (b).

The present invention also relates to the polymer powders obtainable by the process of the invention and to their use, especially for modifying mineral construction materials.

Aqueous dispersions based on styrene-butadiene polymers are important industrial products. They have a considerable cost advantage over dispersions based on styrene-butyl acrylate polymers because butadiene can be separated off directly from the $C_4$ cut of the steam cracker whereas butyl acrylate requires at least two steps for its preparation from steam cracker products. In addition to the principal application as synthetic rubber and as impact modifiers in engineering plastics, aqueous polymer dispersions based on styrene-butadiene polymers are employed in coating compositions, for example for paper, as adhesives, or as binders, in emulsion paints for example, or in synthetic resin bound plasters. EP-A-754 657 reports on the use of aqueous styrene-butadiene polymer dispersions for modifying mineral construction materials.

For a range of the above applications it is desirable to use not the aqueous polymer dispersions themselves but rather the polymer in powder form. To obtain the polymer in powder form the dispersion must be subjected to a drying operation—for example, spray drying or freeze drying. In the case of spray drying, the polymer dispersion is sprayed in a stream of hot air and so dewatered, the drying air and the sprayed dispersion preferably being guided cocurrently through the dryer.

When preparing polymer powders by drying aqueous polymer dispersions it should be noted that the polymer particles of the aqueous dispersion undergo aggregation with one another on drying; that is, they form what are known as secondary particles. The coarsening of the polymer powder which accompanies the formation of secondary particles generally results in poorer performance properties. A further consequence of increased secondary particle formation is the development of polymer deposits on the walls of the dryer, so reducing the powder yield in the drying step.

To reduce the formation of secondary particles on drying it is common to add what are known as drying assistants to the aqueous polymer dispersions. These drying assistants are in many cases also known as spraying assistants, since spray drying in particular promotes the formation of secondary particles.

Typical drying assistants (frequently referred to as spraying assistants) of the prior art are naphthalenesulfonic acid-formaldehyde condensates, as described in der DE-A-24 45 813 and in EP-A-407 889 A1. Further spraying assistants are melamine-formaldehyde condensates, copolymers and homopolymers of vinylpyrrolidone (see e.g. EP-A-78 449 and EP-A-576 844), copolymers of ethylenically unsaturated carboxylic acids with hydrophobic monomers (see e.g. EP-A-467 103) or with hydroxyalkyl esters (see e.g. JP-A-59-162161). Other spraying assistants include the sulfo-containing polymers of EP-A-629 650.

EP-A-62 106 describes the preparation of aqueous polymer dispersions based on (meth)acrylic esters and/or styrene in the presence of polyvinyl alcohol as protective colloid. The spray drying of the dispersions thus obtainable is proposed.

The use of polyvinyl alcohol in the drying of aqueous vinyl ester polymers, such as polyvinyl acetate dispersions, is known from EP-A-56 622, EP-A-680 993, DE-A-22 14 410 and DE-A-26 14 261.

EP-A-601 518 describes the drying of aqueous polyacrylate dispersions in the presence of polyvinyl alcohol.

In the preparation of polymer powders by drying aqueous polymer dispersions in the presence of drying assistants it should be noted that these assistants may have a massive influence on the performance properties of the polymer powders. Furthermore, not every drying assistant is suitable for the drying of a specific polymer dispersion.

In view of the great interest in styrene-butadiene polymers there was interest in preparing them in powder form.

It is an object of the present invention to provide a process for preparing polymer powders composed essentially of vinylaromatic monomers and butadiene.

We have found that this object is achieved by drying aqueous polymer dispersions composed essentially of vinylaromatic monomers and butadiene in the presence of polyvinyl alcohol as the drying assistant. Polymer powders of this kind are notable in particular for their advantageous performance properties in mineral construction materials.

The present invention accordingly provides a process for preparing polymer powders from aqueous polymer dispersions, in which the dispersed polymer P comprises in copolymerized form i) at least one vinylaromatic monomer (a),
ii) 1,3-butadiene as monomer (b), and
iii) one or more monomers (c) different than the monomers (a) and (b), which comprises drying the aqueous polymer dispersion in the presence of polyvinyl alcohol as the drying agent. The present invention also provides the polymer powders obtainable by this process and provides for the use of these polymer powders as binders in paints, varnishes and coating compositions generally, in adhesives, and for modifying mineral construction materials.

In the process of the invention it is possible in principle to employ all commercially available polyvinyl alcohols. These are generally products of the hydrolysis and/or transesterification of polyvinyl acetate or of similar, saponifiable polyvinyl esters or polyvinyl ethers, generally having a degree of saponification >70 mol%, based on the overall number of saponifiable monomer units. A comprehensive overview of commercially available polyvinyl alcohols is given, for example, in Ullmann's Encyclopedia of Industrial Chemistry, 5th ed., Vol. 21A, pp. 743–747 and in C. Finch (ed.), Polyvinyl alcohol, Wiley Interscience, New York, 1973. The polyvinyl alcohol employed in the process of the invention generally has a degree of saponification in the range from 73.4 to 99.9 mol %, corresponding to an ester number of from 1 to 270 mg of KOH/g of polyvinyl alcohol, preferably in the range from 82.6 to 92.4 mol %, corresponding to an ester number of from 90 to 190 mg of KOH/g of polyvinyl alcohol. The degree of polymerization lies preferably within the range from 100 to 5000, in particular in the range from 200 to 1000. The degree of polymerization is to be understood as the average number of monomer units per polymer molecule. Polyvinyl alcohols of this kind generally feature a viscosity in the range from 1 to 40 mPa·s, preferably in the range from 2 to 20 mPa·s (determined by the Höppler method as a 4% strength by weight solution in water at 20° C.).

In the process of the invention the polyvinyl alcohol is generally employed in an amount of from 1 to 30% by weight, preferably from 3 to 20% by weight and, in particular, from 5 to 15% by weight, based on the overall weight of polymer P in the aqueous polymer dispersion. Together with the polyvinyl alcohol it is also possible to employ the known drying assistants of the prior art, with preference being given to hydroxyl-containing polymers. Suitable hydroxyl-containing polymers are, for example, products of the saponification of copolymers of vinyl acetate with ethylene, and copolymers of hydroxyalkyl esters of ethylenically unsaturated carboxylic acids with ethylenically unsaturated carboxylic acids. Among the latter preference is given to those which are composed of from 30 to 70 mol % of ethylenically unsaturated carboxylic acids, such as acrylic acid, and from 30 to 70 mol % of at least one hydroxyalkyl ester of an ethylenically unsaturated carboxylic acid, such as hydroxyethyl acrylate and/or hydroxypropyl acrylate, and whose number-average molecular weight $M_n$ lies within the range from 5000 to 15,000. Polymers of this kind are disclosed, for example, in the prior Patent Application P 197 07 746.3. Prior art drying assistants make up preferably not more than 50% by weight of the overall amount of drying assistants. In addition, the overall content of drying assistants is generally below 30% by weight based on the polymer P.

The aqueous polymer dispersion can be dried in a customary manner by means, for example, of freeze drying or, preferably, spray drying. In the case of spray drying, the polymer dispersions to be dried are dried in the presence of the drying assistant in a drying tower through which a stream of hot air is guided. The temperature of the stream of hot air is generally from 100 to 200° C., preferably from 110 to 150° C., at the drying tower inlet and from about 30 to 90° C., preferably from 50 to 80° C., at the tower outlet. The polymer dispersion to be dried can be introduced countercurrently to the stream of hot air or, preferably, can be introduced in parallel into the stream of hot air. It can be added by way of single-substance or multi-substance nozzles or by way of a rotating disk. The polymer powders are normally separated out using cyclones or filter separators.

In principle the drying agent—that is, both the polyvinyl alcohol of the invention and the drying assistants of the prior art—can be metered into the polymer dispersion that is to be dried, during the drying operation, in the form of solutions, for example, aqueous or aqueous-alcoholic solutions. The drying assistant is preferably added to the polymer dispersion before drying. The drying agent can be added either as solid or, preferably, as a solution: for example as an aqueous-alcoholic solution or, in particular, as an aqueous solution. Alternatively, the polyvinyl alcohol employed in accordance with the invention or the drying assistant of the prior art can be added even during the preparation of the aqueous polymer dispersion, as what is known as a protective colloid (see below). In a preferred embodiment of the present invention the drying assistants are not added until after the preparation of the polymer dispersion. The solids content of the polymer dispersion to be dried, which already includes the drying assistant, is generally in the range from 10 to 60% by weight, preferably in the range from 20 to 50% by weight (calculated in each case as polymer+drying assistant, based on the overall weight of the diserison).

Furthermore, a finely divided inorganic oxide, such as a finely divided silica or a finely divided silicate, e.g., talc, can be added as an anticaking agent to the polymer dispersion to be dried, in the course of the drying operation. The anticaking agent is preferably a finely divided silica having an average particle size in the range from 0.01 to 0.5 $\mu$m, which may either be hydrophilic or have been hydrophobicized.

The anticaking agent can be metered in prior to or during the drying of the polymer dispersion. In another embodiment, the anticaking agent is added to the polymer powder in a mixing apparatus suitable for solids, examples being a vibrator, roller-chair screw mixer or the like. If desired, the anticaking agent is employed in an amount of from 0.05 to 10% by weight and, preferably, in an amount of from 1 to 4% by weight, based on the polymer powder (or on the sum of polymer P+drying assistant in the aqueous polymer dispersion). In general, the polymer P of the aqueous polymer dispersion that is to be dried is composed of at least one vinylaromatic monomer (a) selected preferably from styrene, α-methylstyrene, 2-, 3- and 4-methylstyrene, 4-tert-butylstyrene and the chlorostyrenes, butadiene as monomer (b) and, if desired, the monomers (c) which are different from the monomers (a) and (b).

The monomers (c) comprise:

as monomers (c1), ethylenically unsaturated mono- and dicarboxylic acids having 3 to 8 carbon atoms, such as acrylic, methacrylic, crotonic, acrylamidoglycolic, vinylacetic, maleic and itaconic acid and the monoesters of maleic acid with $C_1$–$C_4$-alkanols, ethylenically unsaturated sulfonic acids, such as vinylsulfonic, allylsulfonic, styrenesulfonic and 2-acrylamidomethylpropanesulfonic acid, and ethylenically unsaturated phosphonic acids, examples being vinylphosphonic, allylphosphonic, styrenephosphonic and 2-acrylamido-2-methylpropanephosphonic acid. The monomers (c1), especially the sulfonic and phosphonic acids, can also be employed in the form of their water-soluble salts—for example, in the form of their alkali metal salts and, in particular, their sodium salts. Particularly preferred monomers (c1) are acrylic acid and methacrylic acid;

as monomers (c2), the amides of ethylenically unsaturated carboxylic acids, such as acrylamide and methacrylamide, and also the N-alkylolamides, preferably the N-methylolamides, of ethylenically unsaturated carboxylic acids, such as N-methylolacrylamide and N-methylolmethacrylamide;

plus monomers (c3), which are different from the monomers (a), (b), (c1) and (c2). These include the hydroxyalkyl esters of ethylenically unsaturated carboxylic acids, especially hydroxyethyl and hydroxypropyl esters, examples being hydroxyethyl acrylate, hydroxypropyl acrylate, hydroxyethyl methacrylate and hydroxypropyl methacrylate, acrylonitrile and methacrylonitrile, N-vinyllactams, such as N-vinylpyrrolidone and N-vinylcaprolactam; preferred monomers (c3) are the hydroxyalkyl esters of ethylenically unsaturated carboxylic acids, especially acrylonitrile and methacrylonitrile and crosslinking monomers (monomers (c4)). The crosslinking monomers include those having a reactive carbonyl group or an epoxy group, examples being N-diacetoneacrylamide, N-diacetonemethacrylamide, acetylacetoxyethyl acrylate and acetylacetoxyethyl methacrylate, glycidyl acrylate and glycidyl methacrylate, and also diethylenically unsaturated compounds, examples being the di- and triacrylates and -methacrylates of di- and trifunctional alcohols, e.g., ethylene glycol diacrylate, diethylene glycol diacrylate, triethylene glycol diacrylate, butanediol diacrylate, hexanediol diacrylate, trimethylolpropane triacrylate and tripropylene glycol diacrylate.

The amount of the monomers (a) and (b) as a proportion of the total constituent monomers of the polymer P is preferably in the range from 80 to 99.5% by weight, the weight ratio of vinylaromatic monomers (a) to butadiene being, in particular, in the range from 3:1 to 1:3 and, with very particular preference, in the range from 2.5:1 to 1:1. Accordingly, the amount of monomers (c) as a proportion of the constituent monomers of the polymer P is in the range from 0.5 to 20% by weight, in particular from 1 to 10% by weight. Herein, preferably, the monomers (c1) make up not more than 5% by weight, based on the overall monomer amount, the monomers (c2) not more than 5% by weight, based on the overall monomer amount, and the monomers (c3) not more than 10% by weight, based on the overall monomer amount. The proportion of crosslinking monomers (c4) is generally less than 5% by weight. In a preferred embodiment the polymers P contain no copolymerized monomer (c4).

In a preferred embodiment of the present invention the polymer P is composed of:

from 25 to 70% by weight, in particular from 50 to 65% by weight, of styrene and/or α-methylstyrene, from 25 to 70% by weight, in particular from 25 to 50% by weight, of butadiene, and of from 0.5 to 4% by weight of monomers (c1), especially acrylic acid and/or methacrylic acid, from 1 to 3% by weight of monomers (c2), especially acrylamide, methacrylamide, N-methylolacrylamide and/or N-methylolmethacrylamide, and/or from 0.5 to 4% by weight of acrylonitrile and/or methacrylonitrile.

Of these, very particular preference is given to those polymers P in which the weight ratio of monomers (a) to butadiene is in the range from 3:1 to 1:3 and, with very particular preference, in the range from 2.5:1 to 1:1. It is also particularly preferred for the polymer P to comprise, in copolymerized form, at least one monomer (c1) and at least one monomer (c2) or at least one monomer (c2) and at least one monomer (c3).

The glass transition temperature of the polymers P that are suitable for the process of the invention lies in general within the range from −50° C. to +50° C. All figures given hereinbelow for the glass transition temperature relate to the midpoint temperature determined by means of differential scanning calorimetry in accordance with ASTM D 3418-82.

The glass transition temperature depends of course on the monomer composition of the polymer P and can be estimated in accordance with Fox (T. G. Fox, Bull. Am. Phys. Soc. (Ser. II) 1, 1956, p. 123). For the glass transition temperature of copolymers it holds in good approximation that at high molecular masses $$\frac{1}{T_g} = \frac{X^1}{T_g^1} + \frac{X^2}{T_g^2} + \cdots \frac{X^n}{T_g^n}$$

where $X^1, X^2, \ldots, X^n$ are the mass fractions $1, 2, \ldots, n$ and $T_g^1, T_g^2, \ldots, T_g^n$ the glass transition temperatures of the homopolymers of each of the monomers $1, 2, \ldots, n$, in kelvin. The latter are known, for example, from Ullmann's Encyclopedia of Industrial Chemistry, VCH, Weinheim, Vol. A 21 (1992) p. 169 or from J. Brandrup, E. H. Immergut, Polymer Handbook $3^{rd}$ ed., J. Wiley, New York 1989.

Preferred polymer dispersions also include those where the weight-average diameter $d_w$ of the dispersed polymer particles is $\geq 100$ nm and with particular preference $\geq 150$ nm. Normally, $d_w$ is $\leq 2000$ nm and preferably $\leq 1000$ nm.

It is also favorable if the diameters of the dispersed polymer particles are distributed over a broad diameter range.

The $d_w$ of the particle size is normally defined as the ponderal median particle size as determined by means of an analytical ultracentrifuge in accordance with the method of W. Scholtan and H. Lange, Kolloid-Z. und Z.-Polymere 250 (1972) 782 to 796. The ultracentrifuge measurement gives the integral mass distribution of the particle diameter of a sample. From this it is possible to derive the percentage by weight of the particles whose diameter is less than or equal to a given size.

A suitable measure to characterize the breadth of the diameter distribution is the quotient $Q=(d_{90}-d_{10})/d_{50}$, where $d_m$ is the diameter not exceeded by m % by weight of the dispersed polymer particles. Q is preferably from 0.2 to 1.5. The preparation of polymer dispersions having such a breadth of particle distribution is known to the skilled worker, for example, from DE-A-43 07 683.

The aqueous polymer dispersion to be dried in accordance with the invention can in principle be prepared by all methods suitable for this purpose. For example, it is conceivable to polymerize the monomers (a), (b) and (c) in a known manner, such as by solution, suspension or precipitation polymerization, to form a polymer P and then to convert this polymer into an aqueous dispersion (a secondary dispersion). Preferably, however, the aqueous polymer dispersion will be prepared by free-radical aqueous emulsion polymerization of the abovementioned monomers. In the case of a free-radical emulsion polymerization an aqueous monomer emulsion is generally polymerized with the aid of a free-radical initiator and in the presence of a surface-active substance, such as a protective colloid and/or an emulsifier system. Appropriate techniques are known in principle from the prior art.

Suitable free-radical polymerization initiators are all those compounds capable of triggering a free-radical aqueous emulsion polymerization. They include both organic and inorganic peroxides and also azo compounds. Redox initiator systems are likewise suitable. Preferred initiator systems are the peroxides, such as hydrogen peroxide, tert-butyl hydroperoxide and isopropyl hydroperoxide. Particular preference is given to the salts of peroxodisulfuric acid, especially their alkali metal salts (e.g., potassium and sodium salt) and/or their ammonium salts. The free-radical initiator is normally employed in an amount of from 0.3 to 2% by weight based on the monomers to be polymerized.

Suitable surface-active substances include both protective colloids—that is, water-soluble polymers having a molecular weight $\geq 2000$ and emulsifiers. The surface-active substances are normally employed in amounts of up 10% by weight, preferably from 0.5 to 5% by weight and, in particular from 1 to 4% by weight, based on the monomers to be polymerized.

Suitable protective colloids are the abovementioned polyvinyl alcohols, starch derivatives and cellulose derivatives, polyacrylic acids, copolymers of acrylic acid and of methacrylic acid with hydrophobic monomers, polyacrylamide, and polymers comprising vinylpyrrolidone. Further suitable protective colloids are the abovementioned hydroxyl-containing copolymers. Preferred protective colloids are the abovementioned polyvinyl alcohols and the abovementioned hydroxyl-containing copolymers.

Suitable emulsifiers can be anionic, cationic or nonionic in nature. The anionic emulsifiers include alkali metal salts and ammonium salts of alkyl sulfates (alkyl: $C_8$–$C_{12}$), of sulfuric monoesters of ethoxylated alkanols (EO units: 2 to 50, alkyl: $C_{12}$ to $C_{18}$) and ethoxylated alkylphenols EO units: 3 to 50, alkyl: $C_4$–$C_9$), of alkylsulfonic acids (alkyl: $C_{12}$–$C_{18}$) and of alkylarylsulfonic acids (alkyl: $C_9$ to $C_{18}$). Other suitable anionic emulsifiers are the salts of the di-$C_6$–$C_{18}$-alkyl derivatives of bis(phenylsulfonyl) ether and its technical-grade mixtures, which are commercially available, for example, as DOWFAX® 2A1 from Dow Chemical Co. Further suitable emulsifiers can be found in Houben-Weyl, Methoden der organischen Chemie, volume XIV/1, Makromolekulare Stoffe, Georg-Thieme-Verlag, Stuttgart, 1961, pp. 192–208.

In addition to these anionic emulsifiers it is also possible to use nonionic emulsifiers. Preferred nonionic emulsifiers are araliphatic or aliphatic nonionic emulsifiers, examples being ethoxylated mono-, di- and trialkylphenols (EO units: 3 to 50, alkyl: $C_4$–$C_9$) and ethoxylates of long-chain alcohols (EO units: 3 to 50, alkyl: $C_8$–$C_{36}$). Preference is given to anionic combinations or combinations of at least one anionic emulsifier and at least nonionic emulsifier.

The molecular weight of the polymers P can be adjusted by adding small amounts, generally up to 2% by weight based on the monomers to be polymerized, of one or more molecular weight regulators, examles being organic thio compounds, silanes, allyl alcohols, and aldehydes.

The emulsion polymerization can be conducted either continuously or batchwise, preferably by a semicontinuous process. In such a process the monomers to be polymerized can be supplied to the polymerization batch continuously, including by a staged or gradient procedure. For this purpose, the monomers can be supplied to the polymerization either as a monomer mixture or as an aqueous monomer emulsion.

Apart from the seed-free mode of preparation it is also possible, in order to establish a defined polymer particle size, to conduct the emulsion polymerization by the seed latex method or in the presence of seed latex prepared in situ. Such methods are known and can be found in the prior art (see EP-B 40419 and also Encyclopedia of Polymer Science and Technology, Vol. 5, John Wiley & Sons Inc., New York 1966, p. 847).

In one preferred embodiment of the present invention the polymerization is conducted in the presence of from 0.01 to 3% by weight and, in particular, from 0.05 to 1.5% by weight of a seed latex (solids content of the seed latex, based on overall monomer amount), preferably with seed latex introduced initially (initial seed charge). The latex generally has a weight-average particle size of from 10 to 400 nm, preferably from 20 bis 120 nm and, in particular, from 20 to 50 nm. Examples of its constituent monomers are styrene, methyl methacrylate, n-butyl acrylate and mixtures thereof, it also being possible for the seed latex to comprise minor amounts of monomers (c2) and/or (c3), examples being acrylic acid and/or methacrylic acid and/or their amides, preferably in an amount of less than 10% by weight based on the overall weight of the polymer particles in the seed latex, in copolymerized form.

Polymerization pressure and polymerization temperature are of minor importance. In general, polymerization is carried out at temperatures between room temperature and 120° C., preferably at temperatures from 40 to 110° C. and, with particular preference, beween 50 and 100° C. at a pressure in the range from 1 to 10 bar.

Following the polymerization reaction proper it may be necessary to substantially free the aqueous polymer dispersions of the invention from odoriferous substances, such as residual monomers and other organic volatile constituents. This can be achieved, conventionally, physically by means of distillative removal (especially by steam distillation) or by stripping with an inert gas. Lessening of the residual monomers can also be carried out chemically, by free-radical postpolymerization, especially under the action of redox initiator systems, as are set out, for example, in DE A 44 35 423, DE-A 44 19 518 and DE-A 44 35 422. Preferably, postpolymerization is conducted with a redox initiator system comprising at least one organic peroxide and an organic sulfite.

In this way it is possible to obtain polymer dispersions having polymer contents of up to 80% by weight, based on the overall weight of the dispersion. In general, the solids content of the polymer dispersions prepared in this way will be in the range from 40 to 60% by weight. The polymer dispersions thus obtainable can then if necessary be adjusted to the solids content desired for drying by dilution with an appropriate solvent—for example, with water or with a water/emulsifier mixture—and/or by addition of an aqueous solution of the drying assistant.

The process of the invention is distinguished by a high powder yield coupled with a comparatively small amount of drying assistant. The polymer powders obtainable by the process of the invention feature particularly good dispersibility and a small proportion of secondary particles. The polymer powders obtainable in accordance with the invention are suitable as binders in paints, varnishes, and coating compositions generally (especially coating slips for paper), in adhesives, including tile adhesives, and in polymer-bound renders (synthetic-resin renders) as described, for example, in EP-A-629 650. In addition, the polymer powders, even when incorporated into mineral construction materials, show no tendency toward discoloration.

The polymer powders obtainable in accordance with the invention are particularly suitable for modifying mineral construction materials and ready-to-use mineral construction-material formulations.

By mineral construction-material formulations are meant formulations comprising at least one mineral binder, such as lime, gypsum, clay and/or cement, with or without mineral aggregates, and which are converted by stirring together with water into their ready-to-use form, this form, when left to itself, solidifying in air or else under water, with or without exposure to an elevated temperature, and as a function of time, to form a stonelike mass (mineral construction material). In addition to the aggregates, mineral construction-material formulations also include customary auxiliaries, examples of which, depending on the intended application, are thickeners or liquefiers and defoamers.

The aggregates consist in general of granular or fibrous, natural or synthetic stone (gravel, sand, mineral fibers) and, in special cases, of metals or organic fibers, or of mixtures of these aggregates. In many cases, color pigments are also used as aggregates for the purpose of imparting color.

The polymer powders of the invention are preferably suitable for modifying those mineral construction materials in which the mineral binder consists from 70 to 100% by weight of cement and from 0 to 30% by weight of gypsum. Common types of cement are blast furnace cement, shale cement, Portland cement, hydrophobicized Portland cement, quick-setting cement, swellable cement or alumina cement, the use of Portland cement being found particularly favorable.

The polymer powder of the invention is used to modify such mineral construction materials, in amounts, depending on the project at hand, of up to 80% by weight, usually from 2 to 50% by weight and in many cases from 3 to 20% by weight, based on the mineral binder. For this purpose the polymer powder can be added to a mineral construction material formulation which in addition to the aggregates, the mineral binder and any customary auxiliaries already includes the required make-up water.

An important form of use of polymer powders relates to their use in what are known as dry formulations of mineral construction materials. By dry formulations are meant those formulations comprising the mineral binder and, if desired, the required aggregates and the auxiliaries, these formulations being converted into the ready-to-use form at the site of use by addition of water. Polymer powders are naturally used to modify such dry formulations.

The dry composition of the mineral construction materials is preferably as follows: from 10 to 60% by weight, preferably from 15 to 50% by weight of mineral binder, from 0.05 to 20% by weight, preferably from 0.1 to 10% by weight and, in particular from 0.2 to 8% by weight of modifying polymer powder, if desired up to 25% by weight of conventional auxiliaries, examples being defoamers or thickeners, and, as a remainder, aggregates such as sand, gravel, fillers (e.g. calcium carbonate), pigments, natural or synthetic fibers, etc.

Mineral construction materials in the form of dry formulations comprising one or more of the polymer powders of the invention are novel and are likewise provided by the present invention.

Such dry formulations can be prepared by blending the individual components—that is, the binder, the aggregates, the auxiliaries (in dry form) and the polymer powder—in the manner customary for pulverulent components, the sequence of blending being, in principle, unimportant and being determined by considerations of what is judicious.

With particular preference, the polymer powders of the invention are suitable for modifying dry formulations for what are known as repair mortars, structurally stable tile adhesives and structurally stable wall filling compositions. These particularly preferred embodiments of the dry formulations of the invention customarily comprise cement as mineral binder.

The repair mortars, structurally stable tile adhesives and structurally stable wall filling compositions preferably comprise:
from 40 to 80% by weight of sand
from 15 to 40% by weight of cement, preferably Portland cement,
up to 2% by weight of customary thixotropic agents,
up to 4% by weight of fibers,
from 0.1 to 2.0% by weight of defoamers,
up to 1 part by weight of liquefiers, and
from 0.1 to 10% by weight, preferably from 0.5 to 5% by weight, of polymer powder of the invention,
the overall mass of the components adding up to 100% by weight.

The particularly preferred drying formulations have particularly advantageous properties if the polymer powder contains from 5 to 15% by weight of polyvinyl alcohol based on the polymer P, especially when the polyvinyl alcohol is one of the polyvinyl alcohols indicated above as being preferred. It is also advantageous for the properties of the repair mortar if the polymer P in the polymer powder has a glass transition temperature (determined on films prepared from the polymer dispersions to be dried) in the range from −40° C. to 30° C. and, with particular preference, in the range from −30° C. to 20° C. Glass transition temperatures of this kind are ensured in particular when the weight ratio of the monomers (a) copolymerized in the polymer P to the copolymerized butadiene (monomer (b)) lies within the range from 1:3 to 3:1 and, in particular, in the range from 2.5:1 to 1:1. The nature and amount of the monomers (a), (b) and (c) are subject to what has been said above.

The sand employed in the repair mortar normally has an arithmatic mean of the maximum particle diameter in the range from 0.06 to 3 mm. The addition of the thixotropic agent serves to lower the flowability of the aqueous mortar prior to its solidification in the resting state. It is common to use a microsilica as the thixotropic agent. To improve the crack bridging capacity, the mortar can be admixed with natural or synthetic fibers, examples being mineral fibers such as asbestos, or polymer fibers, e.g., Dralon® (length e.g. from 1 to 10 mm, linear density e.g. from 3 to 10 dtex).

By adding an appropriate amount of make-up water the dry formulations of the invention are converted into the ready-to-use form. The amount of make-up water here depends, as is known to the person skilled in the art, on the content of mineral binder in the formulation. If the dry formulation comprises cement as mineral binder, it is common to choose a water/cement weight ratio (w/c number) in the range from 0.3 to 0.7.

Ready-to-use mortar formulations comprising the polymer powders of the invention are notable for improved immediate adhesion of the mortar to customary substrates, especially mineral substrates such as concrete, gas concrete, mineral fiberboard, gypsum, render, natural stone, synthetic stone, etc., and, at the same time, for very low tool tack in comparison with mortars comprising a prior art polymer powder. At the same time, the mortars comprising the polymer powders of the invention are equivalent if not superior to the mortars comprising prior art polymer powders in terms both of their immediate stability and of their remodelability.

The following examples are intended to illustrate the present invention without restricting it.

EXAMPLES

I. Preparing the Polymer Dispersions to be Dried (Dispersions D1 to D4 and DV1)

Dispersion D1

A pressure vessel ($N_2$ flushed) was charged with 30.8 kg of water, 126 g of Dowfax® 2 EP (45% strength by weight aqueous emulsifier formulation), 715 g of butadiene, 600 g of a 7% strength by weight sodium peroxodisulfate solution and 2.4 kg of a 30% by weight aqueous polystyrene dispersion (ponderal median polystyrene particle diameter=30 nm) as polymer seed, containing, based on the polystyrene present, 20% by weight of Na $C_{12}$-alkylbenzenesulfonate as emulsifier, and this initial charge was heated to 80° C. with stirring. Following the onset of polymerization the feed streams A, B and C below were supplied to the polymerization vessel, spatially separate but beginning simultaneously, over the course of 4 hours, during which the 80° C. were maintained. After the end of the feeds, the reaction mixture was stirred at 80° C. for 2 hours more and then cooled to room temperature. The polymerization conversion was >99.5% by weight. The pH of the aqueous dispersion medium was subsequently adjusted to a value of 6.5 using a 25% strength by weight aqueous ammonia solution.

This gave an aqueous polymerization dispersion whose solids content was 50% by weight. The proportion of coagulum formed in the polymerization was below 0.5% by weight, based on the amount of monomers to be polymerized. The glass transition temperature of the film of the aqueous polymer dispersion was 23° C. (DSC midpoint). The ponderal median particle diameter of the polymer was 160 nm.

Feed stream A:
  homogeneous mixture of 35.4 kg of water, 9.9 kg of a 3% strength by weight aqueous sodium pyrophosphate solution, 500 g of a 0.4% strength by weight aqueous solution of Na EDTA, 1200 g of Dowfax® 2 EP, 1650 g of a 15% strength by weight aqueous solution of sodium lauryl sulfate, 1000 g of tert-dodecyl mercaptan, 3.47 kg of acrylic acid, 2.98 kg of a 50% strength by weight aqueous acrylamide solution and 63.4 kg of styrene;

Feed stream B:
  30 kg of butadiene;

Feed stream C:
  10.7 kg of a 7% strength by weight aqueous sodium persulfate solution.

Dispersion D2

A pressure vessel ($N_2$ flushed) was charged with 3.5 kg of water, 115 g of a 7% strength by weight aqueous sodium peroxodisulfate solution, 265 g of the polymer seed used for the preparation of D1 and 5% by weight of feed stream 1, and this initial charge was heated to 85° C. with stirring. Following the onset of polymerization the remainder of feed stream 1, and feed stream 2, were supplied to the polymerization vessel, spatially separate but beginning simultaneously, over the course of 5.5 hours, during which the 80° C. were maintained. After the end of the feeds, the reaction mixture was stirred at 85° C. for one hour more and then cooled to room temperature.

The resulting dispersion had a solids content of 51% by weight and a pH of 3.6. The light transmittance of the dispersion (LT of a 0.01% by weight sample) was 42%.

Feed stream 1: Emulsion of
  8400 g of deionized water
  4900 g of butadiene
  9500 g of styrene
  300 g of acrylonitrile
  600 g of aqueous N-methylolacrylamide solution (50% strength by weight)
  525 g of emulsifier solution 1
  180 g of tert-dodecyl mercaptan Feed stream 2: aqueous solution of
  1000 g of deionized water
  240 g of sodium peroxodisulfate The emulsifier solution 1 was a 28% strength by weight aqueous solution of the sodium salt of a sulfonated $C_{12}$ fatty alcohol ethoxylate (2 to 3 EO units; Texapon® NSO from HENKEL KGaA).

The LT stated is the relative light transmittance of a 0.01% by weight aqueous dispersion against water, as determined for white light at 20° C. and at a path length of 2.5 cm.

Dispersion D3

An aqueous polymer dispersion D3 was prepared in the same way as for dispersion D2 except that the polymerization temperature was 90° C.

Initial charge:
  4200 g of deionized water
  300 g of butadiene
  15 g of sodium salt of ethylenediaminetetraacetic acid (Na EDTA)
  30 g of sodium hydrogencarbonate
  44 g of polymer seed (see above)
  45 g of sodium peroxodisulfate Feed stream 1: Emulsion of
  8400 g of deionized water
  5250 g of butadiene
  9000 g of styrene
  150 g of acrylic acid
  600 g of aqueous acrylamide solution (50% by weight)
  250 g of emulsifier solution 2
  75 g of tert-dodecyl mercaptan Feed stream 2: aqueous solution of
  1600 g of deionized water
  75 g of sodium peroxodisulfate The resulting dispersion had a solids content of 52.8% by weight and a pH of 4.3. The light transmittance of the dispersion (LT of a 0.01% by weight sample) was 6%.

Emulsifier solution 2 was a 30% strength by weight aqueous solution of the sodium salt of a sulfonated $C_{12}$–$C_{14}$ fatty alcohol ethoxylate (30 EO units; Disponil® FES 77 from HENKEL KGaA).

Dispersion D4

An aqueous polymer dispersion D4 was prepared in the same way as for dispersion D3.

Initial charge:
  4200 g of deionized water
  300 g of butadiene
  15 g of sodium salt of ethylenediaminetetraacetic acid (Na EDTA)
  30 g of sodium hydrogencarbonate
  44 g of polymer seed (see above)
  45 g of sodium peroxodisulfate Feed stream 1: Emulsion of
  8400 g of deionized water
  6000 g of butadiene
  8250 g of styrene
  150 g of acrylic acid
  600 g of aqueous acrylamide solution (50% by weight)
  250 g of emulsifier solution 2
  75 g of tert-dodecyl mercaptan Feed stream 2: aqueous solution of
  1600 g of deionized water
  75 g of sodium peroxodisulfate The resulting dispersion had a solids content of 51.2% by weight and a pH of 3.1. The light transmittance of the dispersion (LT of a 0.01% by weight sample) was 21%.

Comparative Dispersion DV1

A mixture of
  150.0 g of water
  5.6 g of a 20% strength by weight aqueous solution of an ethoxylated p-isooctylphenol (EO units 25),
  0.48 g of a 35% strength by weight aqueous solution of a Na salt of a sulfated and ethoxylated p-isooctylphenol (EO units 25),
  3.9 g of a 10% strength by weight aqueous formic acid solution,
  1.7 g of sodium hydrogencarbonate and
  3.4 g of a 20% strength by weight aqueous polyacrylamide solution was heated to 90° C. Subsequently, beginning simultaneously and while maintaining the internal temperature of 90° C., an aqueous monomer emulsion was added dropwise continuously to this mixture over 2 h, said emulsion consisting of 291.2 g of n-butyl acrylate, 252.0 g of styrene, 11.2 g of acrylamide, 5.6 g of methacrylamide, 8.4 g of a 20% strength by weight aqueous solution of an ethoxylated p-isooctylphenol (EO units 25), 11.5 g of a 35% strength by weight aqueous solution of an Na salt of a sulfated and ethoxylated p-isooctylphenol (EO units 25) and 162.9 g of water and a solution of 3.3 g of sodium peroxodisulfate in 90 g of water was added dropwise continuously over 2.5 h. Thereafter the reaction mixture was stirred at 90° C. for 120 minutes more and cooled to 60° C. Following the addition of a solution of 1.1 g of t-butyl hydroperoxide in 5.5 g of water, a solution of 0.6 g of sodium hydroxymethanesulfinate in 15 g of water was added over the course of 1 h at this temperature, and stirring was continued for 0.5 h. After 15 minutes the mixture was cooled to room temperature and neutralized with 3.5 g of a 10% strength by weight aqueous ammonia solution. Filtration gave a dispersion having a solids content of 55.4%, a light transmittance of a 0.01% by weight dispersion at 20° C. and at a path length of 2.5 cm (LT) of 9%, and a pH of 7.3. The glass temperature (DSC midpoint, see above) of the polymer was +15° C.

II. Inventive Drying Assistant S1 and Comparative Drying Assistants SV1 and SV2

Drying Assistant S1

The drying assistant S1 was a partially saponified polyvinyl acetate having the following characteristics:

viscosity of a 4% strength by weight aqueous solution at 20° C. =4 mPa·s (measured in accordance with DIN 53015)

degree of hydrolysis: 87.7% ester number: 140 mg of KOH/g of polyvinyl alcohol

Comparative Drying Assistant SV1

1.18 kg of concentrated sulfuric acid were added with cooling to an initial charge of 1.20 kg of naphthalene at 85° C. such that the internal temperature was always below 100° C. Following the end of the addition, reaction was allowed to continue at an internal temperature of 100° C. for 8 h. The reaction mixture was cooled to 50° C., and, while maintaining an internal temperature of from 50 to 55° C., 0.80 kg of a 30% strength by weight aqueous formaldehyde solution was added in portions. After the end of the addition 0.70 kg of fully desalinated water was added immediately, and the mixture was heated to 100° C. and reacted further at this temperature for 5 h. It was then cooled to 65° C., and 0.80 kg of a 35% by weight calcium hydroxide suspension in fully desalinated water was added. The mixture was filtered through a 200 μm sieve to give 2.0 kg of an aqueous solution SV1 having a solids content of 34% by weight and a pH of 7.9.

Comparative Drying Assistant SV2

A reactor was charged with 1.6 kg of sodium peroxodisulfate in 39.3 kg of water. This initial charge was heated to 80° C. Then, while maintaining the temperature, feed stream 1 was added continuously over the course of 2 hours, and reaction was continued at 80° C. for 1.5 hours. Then, while maintaining the temperature, feed stream 2 was added continuously over the course of 1 hour. After a further 60 minutes at 80° C., the reaction mixture was cooled to room temperature and filtered through a 200 μm sieve. This gave a clear aqueous solution of the copolymer, having a solids content of 38.8% by weight and a pH of 4.5. The number-average molecular weight was 11,200 daltons, the weight-average molecular weight 51,200 daltons (per GPC).

| Feed stream 1 | 15.1 kg | of deionized water |
|---|---|---|
| | 9.1 kg | of 25% strength by weight aqueous sodium hydroxide solution |
| | 11.2 kg | of acrylic acid (AA) |
| | 0.1 kg | of ethylhexyl thioglycolate |
| | 28.8 kg | of hydroxyethyl methacrylate (HEMA) |
| Feed stream 2 | 0.4 kg | of sodium peroxodisulfate |
| | 5.3 kg | of deionized water |

III Preparing the Polymer Powders P1 to P4 and PV5 to PV8

The polymer powders were prepared by spray drying in accordance with the details in Table 1. For this purpose the dispersions D1 to D4 and DV1 were diluted with water to a solids content of 40% by weight. The drying assistants were adjusted to a solids content of 20% by weight by dissolving them in or diluting them with water. Then the dispersion was added rapidly and with vigorous stirring to the solution of the drying assistant, and a solids content of 30% by weight was established with fully desalinated water. The respective amounts of drying assistant can be taken from Table 1.

Spray drying was carried out in a Minor laboratory drier from GEA Wiegand GmbH (Niro division) with dual-substance nozzle atomization (nozzle diameter: 1.3 mm). The temperature of the stream of hot air at the tower inlet was about 130° C. and at the tower outlet about 60° C. The drying output was 2 kg of spray feed/h and, simultaneously with the spray feed, 120 g/h of a finely divided silica were metered into the drying chamber as an anticaking agent. The results of spray drying are compiled in Table 1.

TABLE 1

| Powder | Dispersion | Drying assistant [% by wt][1] | Powder yield [%] |
|---|---|---|---|
| P1 | D1 | S1 | 10 | 82 |
| P2 | D2 | S1 | 10 | 74 |
| P3 | D3 | S1 | 10 | 84 |
| P4 | D4 | S1 | 10 | 70 |
| PV1 | D1 | SV1 | 10 | 79 |
| PV2 | D2 | SV1 | 10 | 73 |
| PV3 | D3 | SV2 | 25 | 72 |
| PV4 | DV1 | S1 | 10 | 69 |

[1]based on 100% by weight of polymer P in dispersion

IV Preparing and Performance-testing an Inventive Repair Mortar

A mixer to EN 196/1 was used to prepare a dry formulation for a repair mortar, comprising the following components:

250 g of quartz sand to DIN 1164, Part 7 of particle size group from 0.08 to 0.5 mm, 500 g of quartz sand to DIN 1164, Part 7 of particle size group from 0.5 to 1.0 mm, 217 g of Portland cement 35F, 21.7 g of polymer powder from III.

For performance testing, the dry formulation was made up with the required amount of water (from about 7 g to 13 g per 100 g of dry formulation) such that all of the ready-to-use formulations had the same processing consistency. The respective amount of water required, characterized by the water/cement weight ratio (w/c number), is shown in Table 2.

To examine the performance properties, the mortar freshly prepared by stirring was cast onto a dry concrete slab—that is, not wetted beforehand—using a trowel. It was assessed according to the following properties I to IV. The results are summarized in Table 2:

I Tackiness of the mortar on the tool (no tool tack=1; severe tool tack=6)

II Immediate adhesion of the thrown mortar to the concrete slab (adhesion of the entire thrown material to the slab=1; all of the thrown material drops from the concrete slab and so does not adhere=6)

III Immediate stability of the mortar on the concrete slab (a cone of mortar about 5 cm thick, applied by throwing, does not sag on the slab=1; the mortar adheres to the slab but immediately runs from the wall again=6)

IV Modelability (reworkability) and stability of the mortar on the concrete slab (the mortar has outstanding modeling properties and is stable even under the conditions of modeling=1; mortar falls completely from the slab under the conditions of modeling, or liquefies under the conditions of modeling and flows from the wall=6)

TABLE 2

| | w/c[1] | Properties | | | |
|---|---|---|---|---|---|
| | | I | II | III | IV |
| P1 | 0.51 | 1 | 1–2 | 1 | 1 |
| P2 | 0.52 | 1–2 | 2 | 1 | 1 |
| P3 | 0.52 | 1 | 1–2 | 1 | 1 |
| P4 | 0.52 | 1 | 1–2 | 1 | 1–2 |
| PV1 | 0.40 | 3–4 | 4 | 1 | 6 |
| PV2 | 0.39 | 6 | 6 | 1 | 5 |
| PV3 | 0.32 | 4 | 6 | 3 | 5 |
| PV4 | 0.58 | 3 | 4–5 | 1 | 1–2 |
| PV5[2] | 0.46 | 6 | 6 | 1 | 1 |

[1]w/c number (= weight ratio water/cement)
[2]polyvinyl acetate powder, with polyvinyl alcohol; VINNAPAS ® RE 545 Z, from Wacker Chemie GmbH

We claim:

1. A process for preparing a polymer powder from an aqueous polymer dispersion in which the dispersed polymer P comprises in copolymerized form:

i) at least one vinylaromatic monomer (a), ii) 1,3-butadiene as monomer (b), and optionally iii) one or more monomers (c) different than the monomers (a) and (b), wherein said polymer P is obtained by copolymerizing said monomers (a), b) and optionally (c), which comprises drying the aqueous polymer dispersion in the presence of polyvinyl alcohol in an amount of at least 3% by weight, and not more than 20% by weight, of the dispersed polymer P as drying assistant by spray drying, wherein the weight average diameter $d_w$ of the dispersed polymer particles is $\leq 2000$ nm, to obtain said polymer powder containing said polyvinyl alcohol.

2. A process as claimed in claim 1, wherein the polyvinyl alcohol used has an average degree of polymerization in the range from 100 to 5000.

3. A process as claimed in claim 1, wherein the polyvinyl alcohol used has an ester number in the range from 1 to 270 mg of KOH/g.

4. A process as claimed in claim 1, wherein the amount of polyvinyl alcohol 5 to 15% by weight of the dispersed polymer P.

5. A process as claimed in claim 1, wherein the polymer dispersion is dried in the presence of at least one inorganic antiblocking agent.

6. A process as claimed in claim 1, wherein the weight ratio of the copolymerized monomers (a) to (b) in the dispersed polymer P lies within the range from 1:3 to 3:1.

7. A process as claimed in claim 1, wherein the monomers (c) are selected from the group consisting of ethylenically unsaturated carboxylic acids, the amides of ethylenically unsaturated carboxylic acids, the hydroxyalkyl esters of ethylenically unsaturated carboxylic acids, the N-alkylolamides of ethylenically unsaturated carboxylic acids, acrylonitrile and methacrylonitrile.

8. A polymer powder obtainable by a process as claimed in claim 1.

9. A mineral construction material in the form of a dry formulation comprising at least one polymer powder as claimed in claim 8.

* * * * *